Jan. 29, 1929.
R. N. DOBLE
1,700,672
PACKAGING MACHINE
Filed Sept. 15, 1927  2 Sheets-Sheet 1
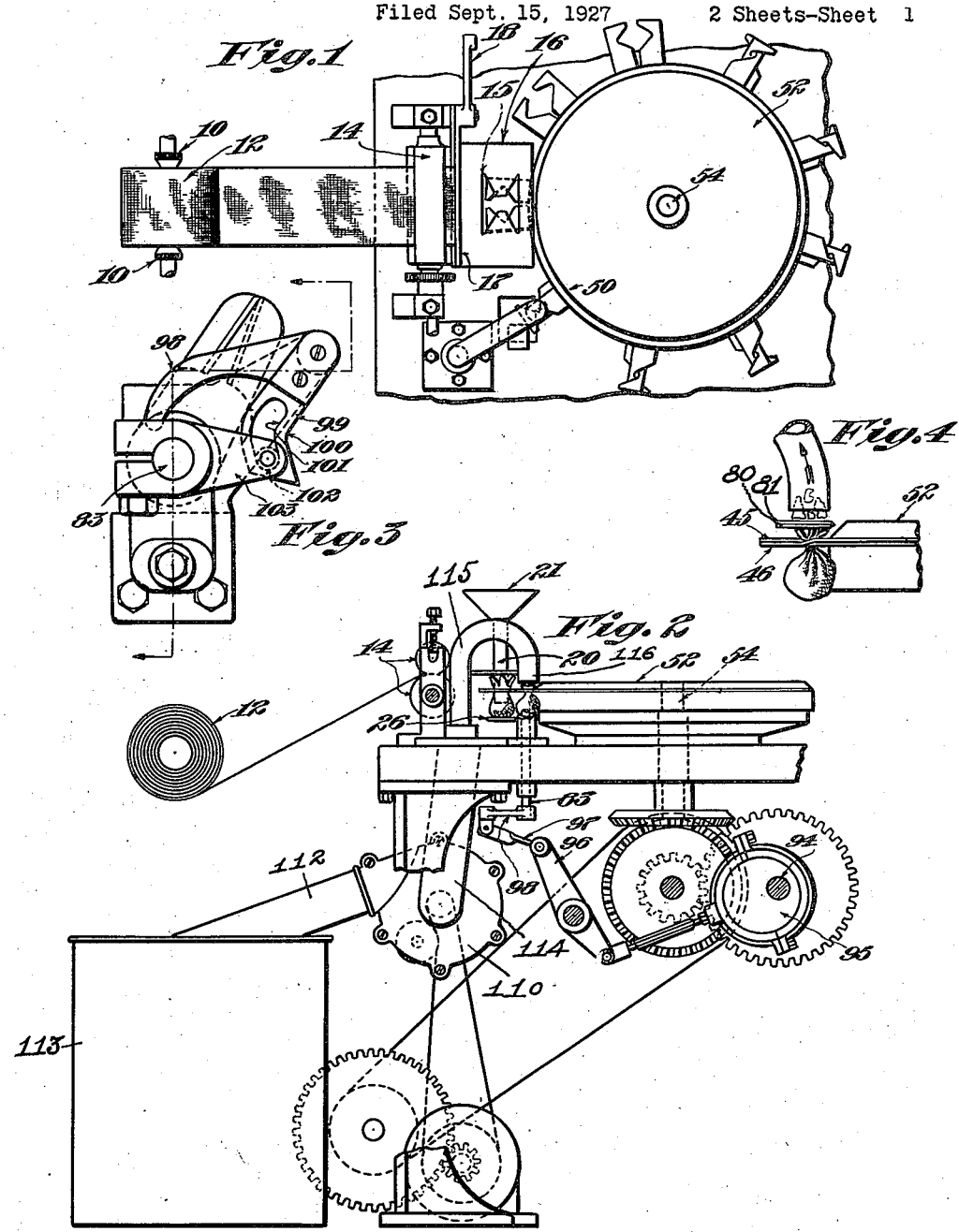
INVENTOR.
Ralph N. Doble
BY J. Stanley Churchill
ATTORNEY.

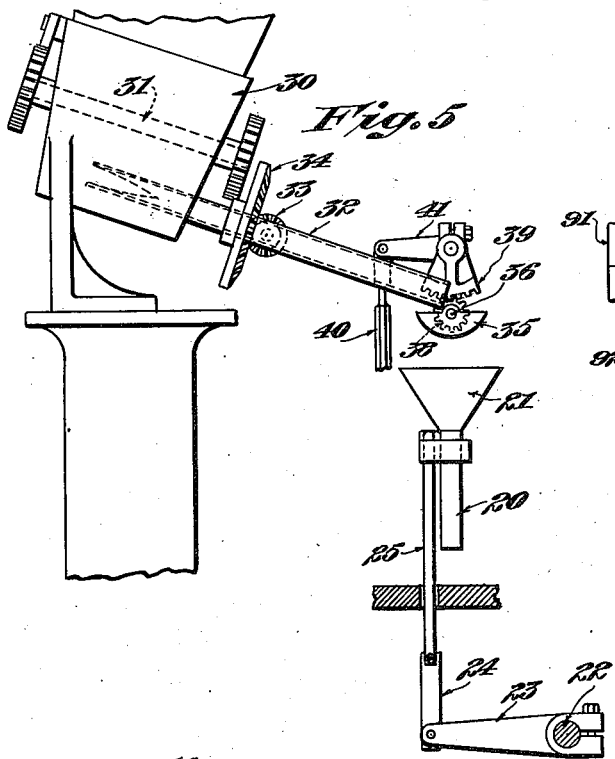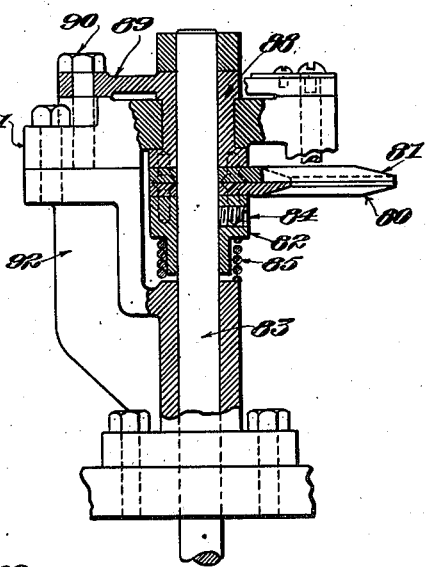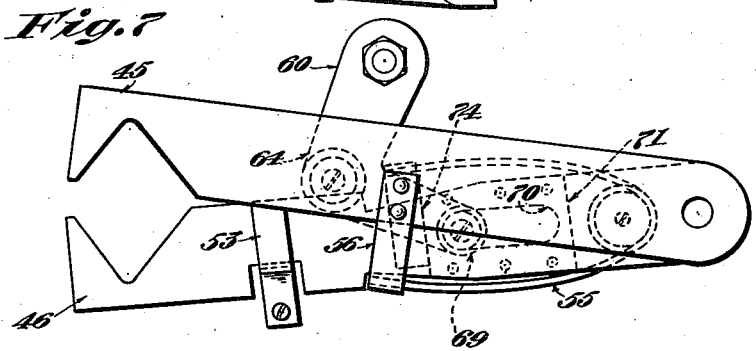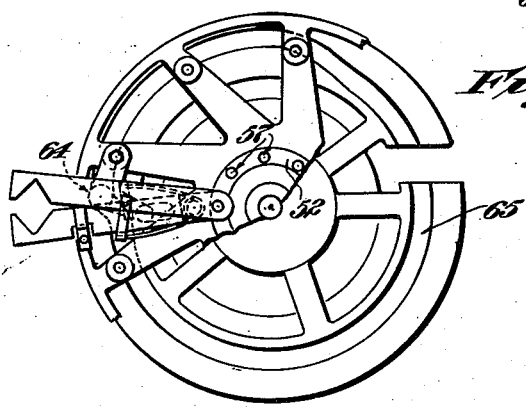

Patented Jan. 29, 1929.

1,700,672

UNITED STATES PATENT OFFICE.

RALPH N. DOBLE, OF BAYSIDE, NEW YORK, ASSIGNOR TO PNEUMATIC SCALE CORPORATION, LIMITED, OF QUINCY, MASSACHUSETTS, A CORPORATION OF MASSACHUSETTS.

PACKAGING MACHINE.

Application filed September 15, 1927. Serial No. 219,794.

This invention relates to a packaging machine.

In general the object of the invention is to provide a novel and improved construction of packaging machine in which provision is made for trimming portions of a wrapper and for automatically removing the trimmings as they are formed in a novel and superior manner.

Certain commodities such as tea are at the present time packed commercially in gauze bags to form so-called tea balls, and automatic machines of the construction forming the subject matter of my co-pending application, Serial No. 698,120 are used commercially to produce such tea balls. In such automatic machines provision is made for cutting off the surplus gauze from the mouth portion of the bag. A more specific object of the present invention is to provide an automatic machine for producing tea balls and in which provision is made for automatically removing the trimmings as they are formed and for conveying them to a storage receptacle in a novel and improved manner.

With these objects in view, the invention consists in the machine and in the structures, arrangements and combinations of parts hereinafter described and particularly defined in the claims at the end of this specification.

In the drawings illustrating the preferred embodiment of the invention, Figure 1 is a plan view of a sufficient portion of a tea bagging machine to enable the present invention to be understood; Fig. 2 is a side elevation of the portion of the present tea bagging machine shown in Fig. 1; Fig. 3 is a detail in plan of the mechanism for trimming off the mouth of the tea bags; Fig. 4 is a detail in side elevation illustrating the manner in which the trimmings are automatically removed; Fig. 5 is a diagrammatic detail in side elevation illustrating the mechanism for filling the tea bags; Fig. 6 is a vertical sectional detail of the trimming cutter and associated mechanism; Fig. 7 is a detail in plan of one of the grippers for contracting the neck portion of the bag; and Fig. 8 is a similar detail illustrating the mechanism for operating the grippers.

As above stated the present invention is preferably embodied in a machine for producing tea balls, and which machine may and preferably will, except as to details to be hereinafter pointed out, comprise the automatic machine forming the subject matter of my co-pending application, Serial No. 698,120. Such a machine has been commercially used in substantial numbers and the details of its construction are now well-known and only sufficient portions thereof have been herein illustrated to enable the present invention to be understood.

Referring to the drawings the improved tea bagging machine illustrated therein is provided with the usual supporting members 10 for rotatably supporting a roll of gauze 12 from which a predetermined length of the gauze is automatically drawn by positively driven feed rolls 14 and fed into a position over a forming die 15 formed in a supporting plate indicated diagrammatically in dotted lines at 16 in Fig. 1 and which is secured to the machine frame. Provision is made for cutting off a definite length of the gauze thus fed by means of a shear 17 operated from a cam (not shown) through suitable connections to a lever 18.

After the length of gauze has been fed into this position over the forming die 15, a plunger 20 in the form of a hollow tube provided with a funnel 21 at the upper end thereof, is arranged to be moved downwardly by a suitable cam (not shown) through connections including a shaft 22, lever 23, and connecting links 24, 25, and engages the gauze, forcing the same down through the forming die 15 by which the gauze is caused to assume a bag shape form such as is illustrated in Fig. 2. The bag comes to rest upon a suitable bracket 26. During the bag forming operation provision is made in the illustrated machine, for feeding a predetermined amount of tea or other commodity through the tube 20, and as represented in Fig. 5, the tea measuring and feeding mechanism includes a supply hopper 30 provided with a driven agitator 31, and from the hopper a stream of tea is arranged to pass through a rotatable conduit 32 driven by cooperating bevel gears 33, 34. The tube 32 is arranged at the proper inclination to produce a flow of tea at the desired rate, and as the tea leaves the end of the tube 32 it is caught in a bucket 35. The bucket 35 is secured upon a rotatable shaft 36 arranged to be oscillated through a gear 38 and segment 39, the latter being arranged to be oscillated from a cam (not shown) through connections including a link 40 and lever 41.

With this arrangement at timed intervals in the operation of the machine, preferably at intervals synchronizing with the reciprocations of the feed tube 20, the bucket 35 is oscillated to dump the tea into the funnel 21 from which the tea passes by gravity down through the tube 20 and into the bag which has been formed by the downward movement of the tube.

After the bag has thus been filled, provision is made for contracting the neck portion of the bag, and as herein shown this operation is performed by a pair of cooperating gripping members 45, 46. During the operation of the illustrated machine provision is made for moving the bag after it has been thus formed and filled to another station, and during such movement the neck portion of the bag is contracted to close the mouth of the bag. At the second station indicated generally at 50 (Fig. 1) provision is made for trimming off the flaring mouth of the bag.

As illustrated, the machine is provided with a rotatable disk 52 (shown in detail in Fig. 8) mounted upon the upper end of a shaft 54 arranged to be intermittently driven by a Geneva motion (not shown). A plurality of cooperating pairs of the gripper members 45, 46 are mounted upon pins 57 at the hub of the disk 52. One of the gripping members 45 comprises a stationary member being held against a stop 53 by one end of a spring 55 which is hooked under a clip 56 attached to the member 45. Provision is made for moving the other or movable gripping member 46 in order to engage the neck portion of the bag to contract the same, and as herein shown a cam arm 60 is provided for each pair of gripping members, being pivoted upon an adjacent spoke of the disk and having a cam roll 64 depending therefrom which is arranged to run in a stationary cam path 65 formed below the rotatable disk 52 and the design of the cam path is such as to allow the spring 55 to close the gripping member 46 to contract the neck portion during the initial movements of the disk and the particular gripping member, from the bag forming and filling station and to thereafter maintain the gripping member in closed position to engage and carry the bag from station to station until such time as the various operations to be described have been performed and the bag is to be ejected from the machine. The cam arm 60 is also provided with a roll 69 which operates in a slot 70 in a block 71 secured to the movable member 46 as shown. In the illustrated machine, and as shown in detail in Fig. 7, the spring 55 serves to engage clips 56 and 74 on the stationary and movable gripping members. The spring serves to close the gripping members when the cam path permits it to do so. The gripping member 46 is moved to open the gripping members at the proper time in the operation of the machine by the effect of the cam path.

The mechanism for shearing off the flaring mouth portion of the bag to trim off the same includes a pair of cooperating shear members 80, 81. The shear member 80 comprises the movable shear member and is fast to the collar 82, and the collar 82 is secured to the shaft 83 by a set screw 84. A coil spring 85 serves to hold the movable shear member 80 in frictional and cutting engagement with the stationary shear member 81. The latter is secured to a fixed piece 88 provided with an arm 89 secured by a bolt 90 to a bracket 91 bolted to a bracket 92 forming part of the machine frame. In the operation of the shear the movable shear member 80 is opened and closed by rocking of the shaft 83, the latter being rocked from a cam shaft 94 through an eccentric 95, lever 96, and connections 97, 98, as shown in Fig. 2. In order to crowd the bag down into the bite of the shears, an arm 99 is secured upon a cam member 100 having a cam slot 101 in which operates a cam roll 102 depending from an arm 103 also secured to the upper end of the rock shaft 83, as shown in detail in Fig. 3.

As above stated the construction and operation of the machine thus far described is well-known and comprises the commercial machine at present being manufactured by Pneumatic Scale Corporation, Limited, of Norfolk Downs, Mass.

Inasmuch as the details of construction of such machine as thus far described of themselves form no part of the present invention, it is thought unnecessary to further describe such details. Provision is made for automatically removing the trimmings as they are cut by the shears 80, 81, and preferably for conveying them to a storage receptacle, and as herein illustrated the machine is provided with a blower 110 having its discharge side connected by a pipe 112 leading to a storage receptacle 113. The suction side of the blower is connected by a pipe 114 to one end of a U-shaped pipe 115, the second end 116 of which is arranged to terminate directly above the shears 80, 81 and in such position that the suction produced within the pipe will operate to automatically suck away all of the trimmings as they are formed by the shears 80, 81 and to conduct them through the blower where they are discharged through the pipe 112 and into the storage receptacle 113.

In this manner the trimmings are automatically removed as they are formed and conveyed to the storage receptacle 113 thus preventing the trimmings from falling into the mechanism of the machine and preventing the possibility of interruption in the successful and automatic operation of the machine.

While it is preferred to employ a pneumatically operated device for removing the trimmings as they are formed in an automatic tea bagging machine, nevertheless it is to be understood that viewed in the broader aspects of the invention the pneumatically operated means for accomplishing this may be used in other forms of machines within the scope of the following claims.

Having thus described the invention what is claimed is:—

1. In a packaging machine, in combination, bag forming and filling mechanism, means for closing the mouth of the filled bag, a trimming device for trimming the mouth of the bag, a storage receptacle, and means for automatically removing the trimmings as they are formed and for conveying them to a storage receptacle.

2. In a packaging machine, in combination, bag filling mechanism, means for closing the mouth of the filled bag, a cutter for trimming surplus material from the mouth of the filled bag, and means for automatically removing the trimmings as they are formed.

3. In a packaging machine, in combination, bag filling mechanism, means for closing the mouth of the filled bag, a cutter for trimming surplus material from the mouth of the filled bag, and pneumatic means for automatically removing the trimmings as they are formed.

4. In a packaging machine, in combination, bag filling mechanism, means for closing the mouth of the bag, a cutter for trimming the mouth of the bag, a pipe having one end thereof disposed adjacent the cutter, and means for creating suction in the pipe.

5. In a packaging machine, in combination, bag filling mechanism, means for closing the mouth of the bag, a cutter for trimming the mouth of the bag, and means for automatically removing the trimmings as they are cut, including a storage receptacle, a blower having its discharging side connected by a pipe to said storage receptacle, and a suction pipe having one end connected to the suction side of the blower and its other end open and disposed immediately adjacent the cutter in a position to automatically suck up the trimmings as they are formed.

6. In a tea bagging machine, in combination, means for wrapping a length of gauze around a quantity of tea, tea feeding means, a cutter for trimming off the corner portions of the length of gauze, and pneumatically operating means for removing the trimmings as they are formed.

7. In a packaging machine, in combination, means for forming a wrapper about a quantity of a commodity, means for trimming portions of the wrapper, a storage receptacle, and pneumatic means for automatically removing the trimmings as they are formed and depositing them in the receptacle.

8. In a packaging machine, in combination, bag forming and filling mechanism operative at one station of the machine, bag closing mechanism, a cutter at a second station for trimming the mouth of the filled bag, and pneumatically operated means located at the second station for automatically removing the trimmings as they are formed.

9. In a packaging machine, in combination, means for forming a bag shaped wrapper about a quantity of a commodity, means for contracting the neck portion of the bag to leave a flaring mouth portion, means for trimming the flaring mouth portion of the bag, and pneumatically operating means for automatically removing the trimmings as they are formed.

10. In a packaging machine, means for cutting a rectangular length of wrapper from a supply thereof, means for wrapping the same about a quantity of a commodity, a gripper for engaging the neck portion of the bag thus formed, a cutter for trimming the mouth of the bag, and pneumatically operated means for automatically removing the trimmings as they are formed.

In testimony whereof I have signed my name to this specification.

RALPH N. DOBLE.